United States Patent
Pasula et al.

(10) Patent No.: US 12,277,675 B2
(45) Date of Patent: *Apr. 15, 2025

(54) METHOD FOR RENDERING USER INTERFACE AND COMPUTING DEVICE THEREFOR

(71) Applicant: Supercell Oy, Helsinki (FI)

(72) Inventors: Markus Pasula, Helsinki (FI); Jaakko Iisalo, Helsinki (FI)

(73) Assignee: Supercell Oy, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,503

(22) Filed: Apr. 26, 2024

(65) Prior Publication Data
US 2024/0346622 A1 Oct. 17, 2024

Related U.S. Application Data

(63) Continuation of application No. 17/741,875, filed on May 11, 2022, now Pat. No. 12,008,733.

(51) Int. Cl.
*G06T 3/60* (2024.01)
*G06T 3/20* (2006.01)

(52) U.S. Cl.
CPC .............. *G06T 3/60* (2013.01); *G06T 3/20* (2013.01); *G06T 2200/24* (2013.01)

(58) Field of Classification Search
CPC ......... G06T 3/60; G06T 3/20; G06T 2200/24; A63F 13/52; A63F 13/5378; G01C 21/367
See application file for complete search history.

(56) References Cited

U.S. PATENT DOCUMENTS

| | | | |
|---|---|---|---|
| 2009/0244072 A1* | 10/2009 | Pugach | G06T 13/00 345/475 |
| 2011/0187716 A1* | 8/2011 | Chen | G06T 17/05 715/782 |
| 2013/0155058 A1* | 6/2013 | Golparvar-Fard | G06Q 10/06311 345/419 |
| 2013/0325321 A1* | 12/2013 | Pylappan | G01C 21/20 701/410 |
| 2019/0080491 A1* | 3/2019 | Saito | A61B 6/463 |
| 2019/0277961 A1* | 9/2019 | Chowdhury | G01S 15/87 |
| 2020/0016483 A1* | 1/2020 | Tahkokallio | A63F 13/837 |
| 2020/0126266 A1* | 4/2020 | Li | G09G 5/14 |
| 2024/0168193 A1* | 5/2024 | Giolito | G06T 7/20 |

* cited by examiner

*Primary Examiner* — Michael Le
(74) *Attorney, Agent, or Firm* — Ziegler IP Law Group, LLC.

(57) ABSTRACT

Disclosed is a method for rendering a user interface, the method including providing a digital map, the digital map having a first area surrounding at least partly a target area, defining a point of rotation on the digital map, providing locator co-ordinates in respect to the digital map, rendering, on the user interface, provided locator co-ordinates within first area of the digital map and rotating, about the point of rotation, the digital map to align the target area in a predetermined direction with respect to the user interface. Disclosed also is a computing device for rendering a user interface on a display thereof.

16 Claims, 7 Drawing Sheets

METHOD FOR RENDERING USER INTERFACE AND COMPUTING DEVICE THEREFOR

TECHNICAL FIELD

The present disclosure relates generally to a user interface; and more specifically, to a method for rendering a user interface. The present disclosure also relates to a computing device for rendering a user interface.

BACKGROUND

In recent years, the use of computing devices, such as smartphones, tablets, laptops, desktops, and the like, for the purpose of navigation has increased. Thus, the number of users using the navigation application has increased drastically. Typically, the navigation application may be used as an onboard vehicle navigation system to reach from one location to the other location. Moreover, the navigation application may be implemented in a game to move the characters in the game from one location to another. Mostly, any of the aforesaid navigation applications displays only a portion of a map based on a map data that describes relative locations of for example streets, highways, points of interest, and the like, on the user interface. Moreover, some navigation application may also provide a navigation feature, which provides the user with turn-by-turn instructions to reach a destination location.

However, performing navigation on a user interface rendered specifically on a portable computing device is difficult due to disorientation of the map. Notably, disorientation of the map makes it difficult to know in which direction the map is being scrolled or moved by a user. Moreover, the portable computing device shows only a portion of the entire landscape of the map on the screen of the computing device, thus making it difficult to find the destination location. Conventionally, the maps and the user interfaces may have a compass to indicate to a direction (preferably, North). However, this may require providing additional symbols on the user interface resulting in a cluttered map data.

Therefore, in light of the foregoing discussion, there exists a need to overcome the aforementioned drawbacks associated with the conventional navigation applications.

SUMMARY

The present disclosure seeks to provide a method for rendering a user interface. The present disclosure also seeks to provide a computing device for rendering a user interface. The present disclosure seeks to provide a solution to the existing problem of conventional navigation applications. An aim of the present disclosure is to provide a solution that overcomes at least partially the problems encountered in prior art, and provides an efficient, reliable, and easy way to reach the destination location.

In one aspect, an embodiment of the present disclosure provides a method for rendering a user interface, the method comprising:
 providing a digital map, the digital map comprising a first area surrounding at least partly a target area;
 defining a point of rotation on the digital map;
 providing locator co-ordinates in respect to the digital map;
 rendering, on the user interface, the provided locator co-ordinates within the first area of the digital map; and
 rotating, about the point of rotation, the digital map to align the target area in a predetermined direction with respect to the user interface.

In another aspect, an embodiment of the present disclosure provides a computing device for rendering a user interface, the computing device comprising:
 a display for rendering the user interface; and
 a processor configured to:
  provide a digital map, the digital map comprising a first area surrounding at least partly a target area;
  define a point of rotation on the digital map;
  provide locator co-ordinates in respect to the digital map;
  render, on the user interface, the provided locator co-ordinates within the first area of the digital map; and
  rotate, about the point of rotation, the digital map to align the target area in a predetermined direction with respect to the user interface.

In yet another aspect, an embodiment of the present disclosure provides computer program product for rendering a user interface, the computer program product comprising a non-transitory machine-readable data storage medium having stored thereon program instructions that, when accessed by a processor, cause the processor to carry out the aforementioned method.

Embodiments of the present disclosure substantially eliminate or at least partially address the aforementioned problems in the prior art, and enable the digital map to be rendered on the user interface in such a way that the direction of movement through the digital map is always in a direction leading towards the target area to help the user to find the target area with ease. Moreover, the disclosed method and system also enables the user to locate the target area on the digital map even after scrolling on the digital map rendered on a limited display screen area.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
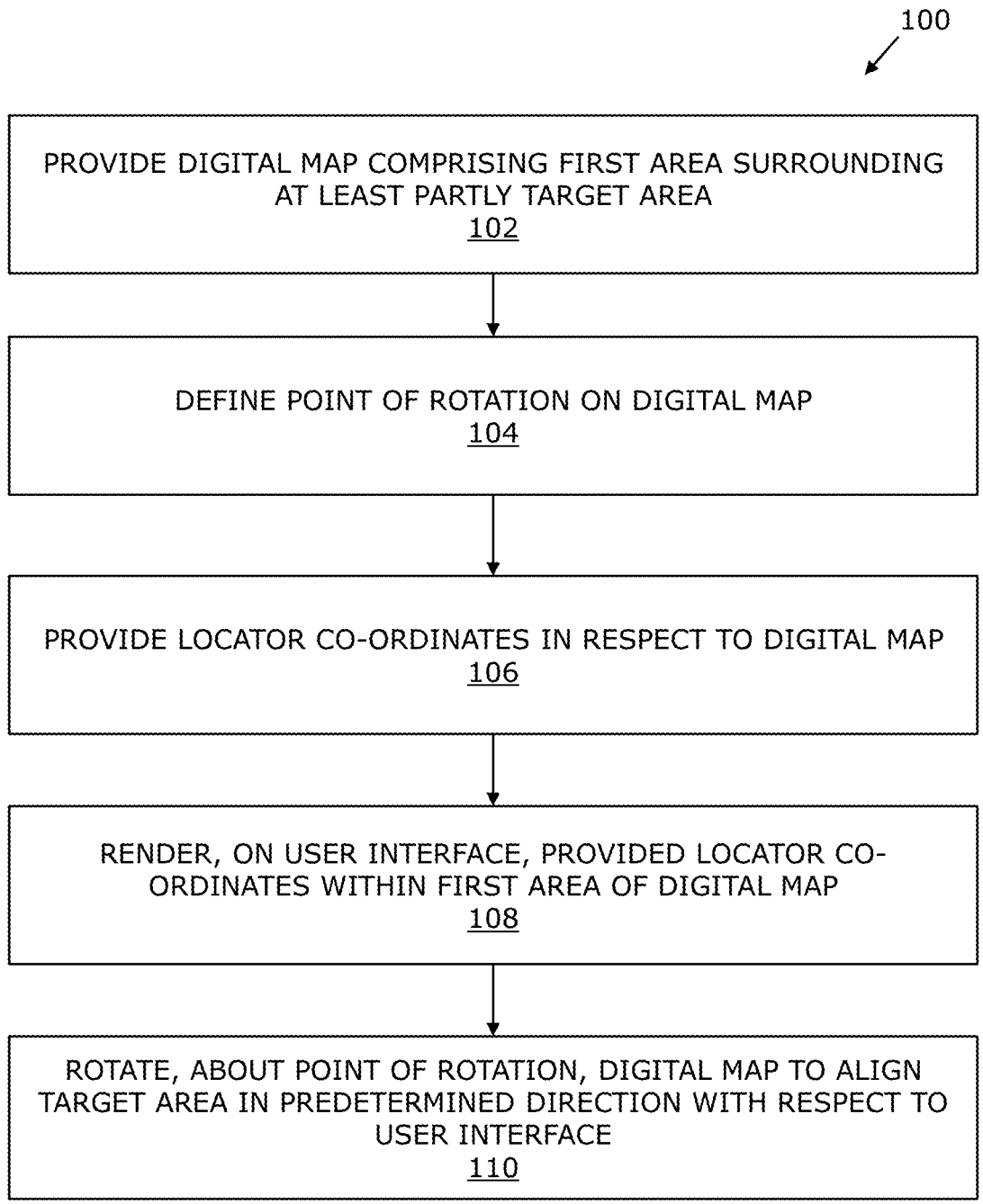
FIG. 1 is a flowchart of steps of a method for rendering a user interface, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for rendering a user interface, the method comprising:
  providing a digital map, the digital map comprising a first area surrounding at least partly a target area;
  defining a point of rotation on the digital map;
  providing locator co-ordinates in respect to the digital map;
  rendering, on the user interface, the provided locator co-ordinates within the first area of the digital map; and
  rotating, about the point of rotation, the digital map to align the target area in a predetermined direction with respect to the user interface.

In another aspect, an embodiment of the present disclosure provides a computing device for rendering a user interface, the computing device comprising:
  a display for rendering the user interface; and
  a processor configured to:
    provide a digital map, the digital map comprising a first area surrounding at least partly a target area;
    define a point of rotation on the digital map;
    provide locator co-ordinates in respect to the digital map;
    render, on the user interface, the provided locator co-ordinates within the first area of the digital map; and
    rotate, about the point of rotation, the digital map to align the target area in a predetermined direction with respect to the user interface.

In yet another aspect, an embodiment of the present disclosure provides a computer program product for rendering a user interface, the computer program product comprising a non-transitory machine-readable data storage medium having stored thereon program instructions that, when accessed by a processor, cause the processor to carry out the aforementioned method.

The present disclosure provides the aforementioned method and the aforementioned computing device for rendering the user interface. The user interface provides a digital map having the target area that is required to be reached by the user from his initial location in the first area. Beneficially, the digital map is rotated in a way that the target area is always in predetermined direction with respect to the user and the user interface, thereby making it easier to view (or use) such maps even on a portable computing device that may be associated with various degrees of disorientation when in use. Moreover, when locator object (representing the user in the user interface) moves in the predetermined direction relative to the user interface, the locator object approaches the target area for example arranged on the top of the user interface. Beneficially, such predetermined direction of the target area prevents putting additional symbols such as a compass to define the direction of the target area, and also makes it easy for the locator object to reach the target area.

Throughout the present disclosure the term "rendering" as used herein refers to a process of loading or generating a graphical visual or a user interface on a display of a computing device. Typically, during rendering features like geometry, viewpoint, texture, lighting, and shading information of the user interface are important. Notably, the rendering is used in architectural design, video game, navigation application and design visualization. For example, rendering a map of the video game for the user for playing. The video game may be a single-player or multiplayer game. Optionally, due to high user interaction in interactive graphics (such as navigation application) and video games images are produced at a rapid pace hence the real-time rendering is used.

The term "user interface" as used herein refers to a space where interaction between user and the computing device occurs. Typically, the user interface comprises one or more spatially distributed elements. Optionally, the user may be any entity such as a person (i.e., human being) or a virtual program (such as, an autonomous program or a bot) that is associated with or operates the computing device. The computing device refers to an electronic device associated with (or used by) the user, that is capable of enabling the user to perform specific tasks Optionally, the computing device may include, but is not limited to, a cellular phone, personal digital assistants (PDAs), handheld devices, laptop computers, personal computers, and so forth, configured to provide the user interface thereon, such as on a display (or screen) thereof. Beneficially, the interaction between the user and the computing device allows effective operation and control therebetween. Moreover, the user interface design is to allow the user to interact easily, efficiently, and in a user-friendly manner with the computing device to provide maximum usability, thereby reducing the amount of user input to achieve a desired output.

Typically, the user interface may be composed of one or more layers, including a human-machine interface (HMI) that interfaces machines with physical input hardware such as keyboards, a mouse, or game pads, and output hardware such as computer monitors, speakers, printers and the like. Moreover, a UI layer may interact with one or more human senses, the one or more human senses may be selected from tactile UI (touch), visual UI (sight), auditory UI (sound), olfactory UI (smell), equilibria UI (balance), and gustatory UI (taste). Herein, the user interface is composed of the visual UI and the tactile UI to display graphics and receive user inputs, respectively. Moreover, the aforementioned user interface, when sound is added to the user interface, becomes a multimedia user interface (MUI).

The term "digital map" as used herein refers to an electronic map which represents a geographical (or cartographic) data in an electronic form thereof. In this regard, the geological features such as a hill, a river, a road, a building, a garden, and so forth, may be represented as graphical elements, such as a rectangle, circle, line, point, polygon, linear or curved text, image, and so forth. Beneficially, the digital map enables storing real-time and recent version of a geographical area as geoinformatics which may be used to locate one or more geographic areas easily by the user. Moreover, the digital map may be used to determine the time and the distance required to travel from a first point to a second point in the said geographical area. In this regard, the first point may be a starting location of the user in the first area of the digital map and the second point may be a desired end location, namely the target area, where the user wants to reach.

The term "first area" as used herein refers to at least a portion of the digital map rendered on the user interface configured to have the target area therein. Typically, the first area may be a landscape configured to render visible features of an area of land. Optionally, the first area may be a circular area, a rectangular area, a triangular area or any closed shape limited by a border thereof. For example, the first area may be depicted as a circular island having one or more elements, each of which corresponds to a defined locator coordinate, therein. Herein, the one or more elements may be for example a home, a hotel, a restaurant, a stadium, a shop, a park, a museum, a tree, and the like. It will be appreciated that at least one of the one or more elements forms the target area. In an exemplary implementation, the first area may be a portion of a video game displaying the elements that may be accessed by an avatar, a digital replica, a digital character, or an animated graphic, or a symbol representing the user by performing one or more actions.

The term "locator co-ordinates" as used herein refers to locations of one or more elements within the first area. In this regard, the locator co-ordinates may correspond to a home, a hotel, a restaurant, a stadium and any other geographical location having a corresponding geographical co-ordinate associated therewith. Optionally, the first area may comprise a plurality of locator co-ordinates associated with a plurality of elements therein. Notably, at least one of the one or more locator co-ordinates associated with the one or more elements is rendered on the user interface.

The term "target area" refers to the destination location of the user. In this regard, the target area may be a home, a hotel, a restaurant, a stadium or any other geographical location. It will be appreciated that the target area is visible on the user interface of the computing device during navigation or scrolling over the digital map when the user is close to the target area by for example moving left, right, top or down with respect to the user interface. Optionally, the target area may be changed by the user during the time of travel, such as while using the onboard vehicle navigation system.

Optionally, the user interface is implemented as a navigation map-type user interface, a game map-type user interface. Optionally, the navigation map-type user interface may be a real-world environment. In this regard, the user interface may be the navigation map of a city. Notably, when a GPS associated with the computing device is switched on, a GPS sensor activates and find the coordinates of the computing device corresponding to the current location by communicating with the satellite. Optionally, an artificial intelligence (AI) system is configured to apply the techniques to adapt itself and learn to improve the navigation using the digital map. In this regard, the AI system employs techniques, to evaluate real-time conditions of a route and provide an optimum route to help the user to avoid traffic and other road hazards. Moreover, the AI system provides navigation information to identify hard-braking events. Beneficially, the implementation of the AI system improves efficiency by reducing the travel time of the user. Additionally, provides the optimum travelling speed of the user based on the mode of transportation. In an example, the navigation map-type may be a map of a city implemented as the first area that comprises the city centre implemented as the target area.

Optionally, the game map-type user interface may be implemented as a map of the game (namely, the game map-type user interface) to navigate within the game. Moreover, the game map-type user interface may be configured to allow the user to play the game as a single-player game or as a multiplayer game. Beneficially, the disclosed navigation map-type user interface and the game map-type user interface are configured to provide an easy way to find direction to reach a desired location (namely, the target area). Optionally, the navigation map-type user interface and the game map-type user interface may have a compass to indicate North.

Optionally, the user interface may comprise a mini digital map providing a high-level view of the digital map. It will be appreciated that the mini digital map is an additional map displayed on the user interface. The mini digital map provides the top or high-level view of the portion of the target area of the digital map. Beneficially, the high-level view helps the user to locate the target area while scrolling through the map.

The term "point of rotation" as used herein refers to a point on a digital map about which the digital map rotates to change the orientation of the one or more elements thereon. It will be appreciated that the point of rotation is an imaginary point. Furthermore, when the digital map is rotated, the target area is always in a predetermined direction with respect to the user interface.

Optionally, the point of rotation is located within the target area such that the target area has a predetermined radius from the point of rotation. The term "predetermined radius" as used herein refers to a distance between the point of rotation and the target area. Herein, the point of rotation may be at a centre of the target area, near the centre of the target area or closer to a boundary of the target area.

Optionally, the method further comprises:
rendering a locator object in the user interface at the locator co-ordinates, wherein the locator object is rendered substantially at a centre with respect to the user interface;
controlling the locator object to move in the predetermined direction with respect to the user interface; and
generating an illusion of movement of the locator object on the user interface by re-rendering at least one portion of the digital map based on the predetermined direction with respect to the user interface.

In this regard, the term "locator object" as used herein refers to a symbol configured to indicate the location of the user on the user interface. It will be appreciated that the locator object is rendered on a layer of the user interface that is different from a layer of the user interface for rendering the digital map. In this regard, the locator object moves relative to the digital map and/or the user interface. Optionally, the locator object may be a car symbol, a boat symbol, a pointer, an avatar, an animated character, and the like. Notably, the locator object may have the geographic co-ordinates associated with it. In this regard, the locator object indicates the real-time movement of the user in the digital map on the user interface. Typically, the locator object is a visual (or graphical) representation of the user that helps in tracking the movement on the computing device. Additionally, the locator object also enables the user to locate other users such as in a multiplayer video game. In such case, the locator object may be a graphical representation of a soldier, a troop of soldiers, weapons systems such as tanks and other vehicles, or any other person or even an animal or fictional character configured to execute one or more actions in the video game. Alternatively, the user may control the movement locator object with a controller to move in the predetermined direction with respect to the user interface. Optionally, the locator object may be stationary and the user interface rotates according to the navigation instructions. Notably, locator co-ordinates are re-rendered on the digital map to generate an illusion of movement on the user interface.

Optionally, the rotation of the digital map is:
clock wise in respect to the point of rotation, if the movement of the locater object within the first area is indicated towards a right direction in respect to the predetermined direction;
counter clock wise in respect to the point of rotation, if the movement of the locater object within the first area is indicated towards a left direction in respect to the predetermined direction; or
disabled when the locator object is within the target area.

In this regard, the digital map may be rotated in clock wise or counter clock wise direction about the point of rotation when the locater object moves toward the right or left direction, respectively, i.e. in a direction of the movement of the locator object. It will be appreciated that when the locator object is within the target area the digital map is not required to rotate. In such case, optionally, the digital map is scrolled in a direction of movement of the locator object when the locator object is within the target area. It will be appreciated that the locator object is always visible on the user interface. Notably, the digital map is not rotated about the point of rotation when the locator object is within the target area, in addition, the relative rotational movement between the target area and digital map is fixed. In this regard, when scrolling the digital map to left, right, up or down, the locator object does not rotate. Beneficially, this helps to navigate the user within the target area and avoid rapid rotations, when rendering the user interface.

Optionally, a speed of the rotation along the point of rotation is a function of a distance of the locator object from the point of rotation and a function of a speed of the movement of the locator object. In this regard, the function $\omega=v/r$ is applied to calculate the speed of rotation, where $\omega$ denoted the speed of rotation (namely, angular velocity), v denoted the speed of the movement of the locater object and r denotes the distance from the point of rotation. Optionally, the speed of the rotation is inversely proportional to the distance of the locator object from the point of rotation. In this regard, the speed of rotation is slower if the locator object is far from the point of rotation and the speed of rotation is faster if the locator object is close to point of rotation. Notably, the speed of the movement of the locater object as the digital map is scrolled stays the same independently of the distance from the point of rotation.

The present disclosure also relates to the computing device for rendering a user interface as described above. Various embodiments and variants disclosed above apply mutatis mutandis to the computing device for rendering a user interface.

The term "display" as used herein refers to the screen of the computing device. Typically, the display may be a screen of the computing device configured to provide the visual graphic of the user interface to the user. Optionally, the display may be selected from liquid crystal display (LCD) light-emitting diode (LED), backlit LCD, thin-film transistor (TFT) LCD, organic LED (OLED), Quantum dot (QLED) display, OLED display, AMOLED display, Super AMOLED display. Optionally, the display comprises a protective covering to protect the display against physical damage.

The term "processor" as used herein refers to a computational element that is operable to respond to and processes instructions that drive the computing device for rendering the user interface. The processor includes but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Additionally, the one or more individual processors, processing devices and elements are arranged in various architectures for responding to and processing the instructions that drive the computing device.

Additionally, the computing device may include a camera, a memory, a communication interface, a microphone, a speaker, and so forth, for performing different tasks associated with the aforementioned method. Moreover, the computing device is configured to host the application programming interface thereon to support and/or enable the operation. Specifically, the application programming interface logs in to display of the computing device to access the communication interface and display a virtual system. The application programming interface enables sending commands to the processor to control, configure or orchestrate one or more programmable components, such as the computing device.

Optionally, the processor is further configured to:
render a locator object in the user interface at the locator co-ordinates, wherein the locator object is rendered substantially at a centre with respect to the user interface;
control the locator object to move in the predetermined direction with respect to the user interface; and
generate an illusion of movement of the locator object on the user interface by re-rendering at least one portion of the digital map based on the predetermined direction with respect to the user interface.

Optionally, the user interface is implemented as a navigation map-type user interface, a game map-type user interface.

Optionally, the user interface comprises a mini digital map providing a high-level view of the digital map.

Optionally, the computing device is a navigator. The term "navigator" as used herein refers to a device configured to provide the navigation to the user.

The present disclosure also relates to the computer program product as described above. Various embodiments and variants disclosed above apply mutatis mutandis to the computer program product.

DETAILED DESCRIPTION OF THE DRAWINGS

Referring to FIG. 1, illustrated a flowchart 100 of steps of a method for rendering a user interface, in accordance with an embodiment of the present disclosure. At step 102, a digital map comprising a first area surrounding at least partly a target area is provided. At step 104, a point of rotation is defined on the digital map. At step 106, locator co-ordinates are provided in respect to the digital map. At step 108, the provided locator co-ordinates within the first area of the digital map, is rendered on the user interface. At step 110, the digital map is rotated, about the point of rotation, to align the target area in a predetermined direction with respect to the user interface.

The steps 102, 104, 106, 108 and 110 are only illustrative and other alternatives can also be provided where one or more steps are added, one or more steps are removed, or one or more steps are provided in a different sequence without departing from the scope of the claims herein.

Figure 2:
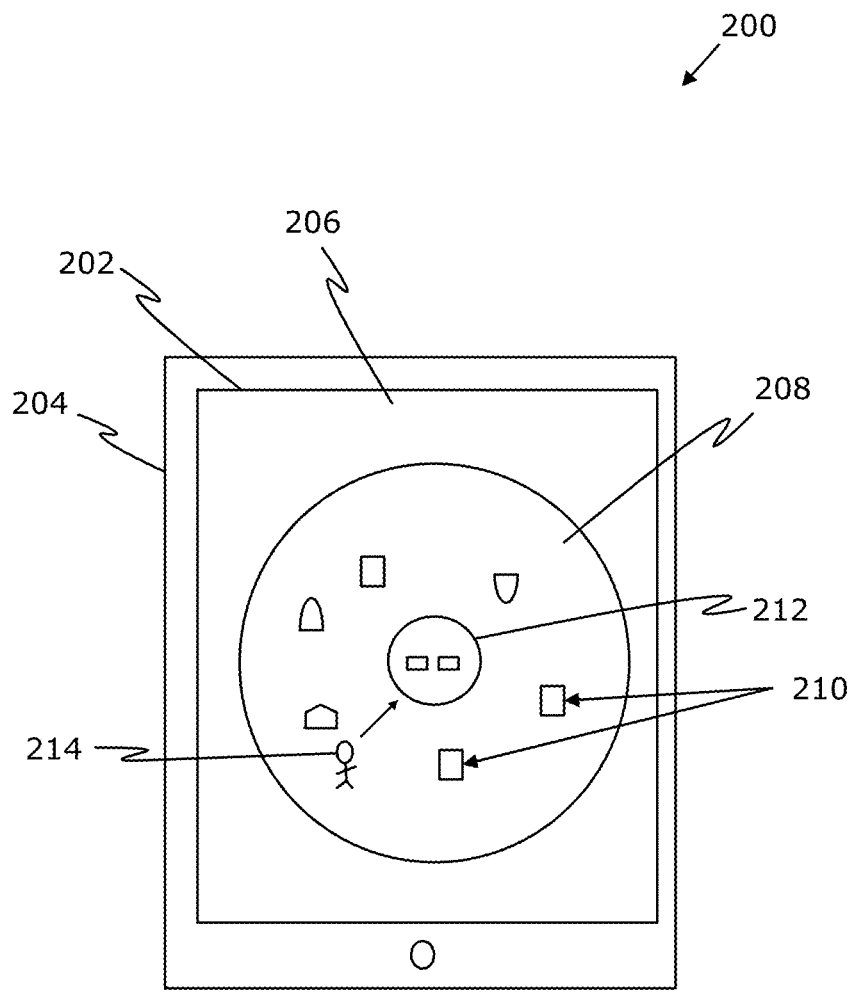
FIGS. 2 to 7 are schematic illustrations of a user interface, in accordance with various embodiments of the present disclosure.

Referring to FIGS. 2 to 7, illustrated schematic illustrations of the user interface 200, in accordance with various embodiments of the present disclosure. As shown in FIG. 2, the user interface 200 is rendered on a display 202 of a computing device 204. In the user interface 200 a digital map 206 is rendered. The digital map 206 comprises a first area 208 having locator co-ordinates 210. Moreover, the first area 208 comprises a target area 212. The movement of the user is depicted on the user interface 200 by a locator object 214. As shown, herein the locator object 214 is implemented as a game character.

Figure 3:
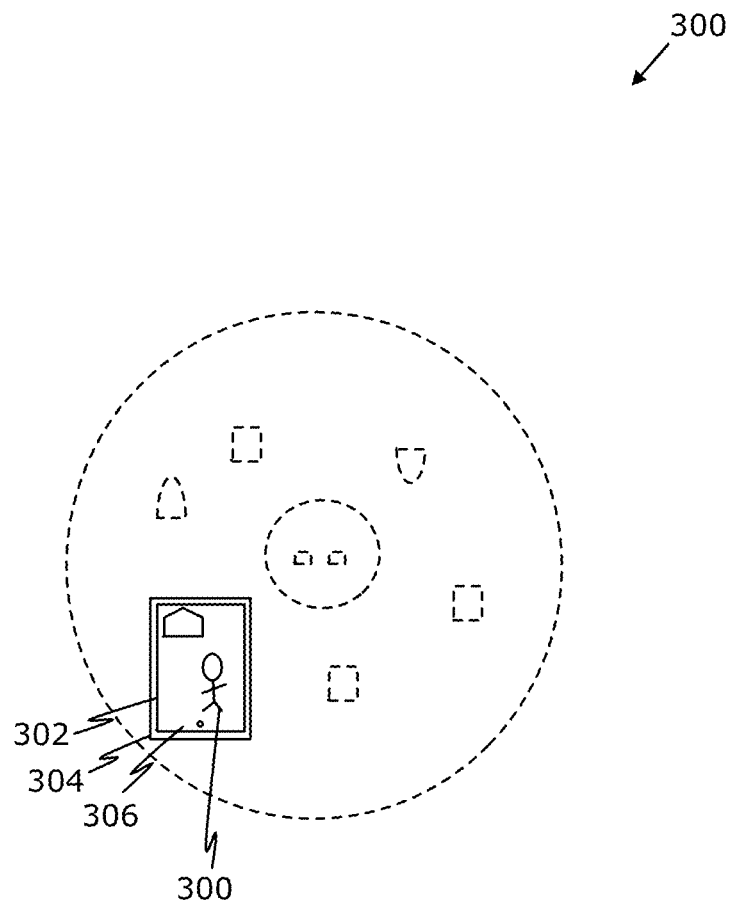

As shown in FIG. 3, the user interface 300 is rendered on a display 302 of a computing device 304. The user interface 300 provides a digital map 306 in a zoomed-in manner so that only a portion of the digital map 306 is visible on the computing device 304. The portion of the digital map 306 which is not rendered on the computing device 304 is indicated with dashed lines.

Figure 4:
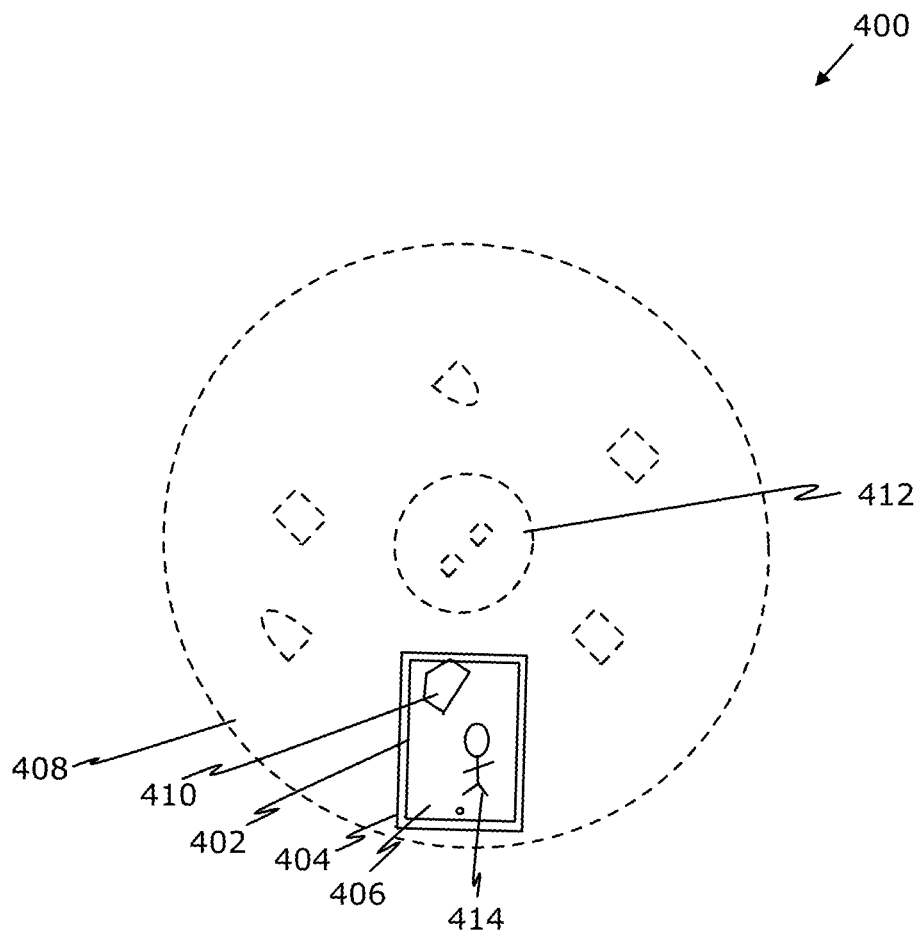

As shown in FIG. 4, the user interface 400 on is rendered a display 402 of a computing device 404. The user interface 400 provides a digital map 406. As shown, as the digital map 406 is rotated, to about 30 degrees counter clock wise, the first area 408 and locator co-ordinates 410 therein, the target area 412 and locator co-ordinates therein are also rotated with respect to and are rendered on the user interface 400. It will be appreciated that the locator object 414 rendered on the digital map 406 is not rotated.

Figure 5:
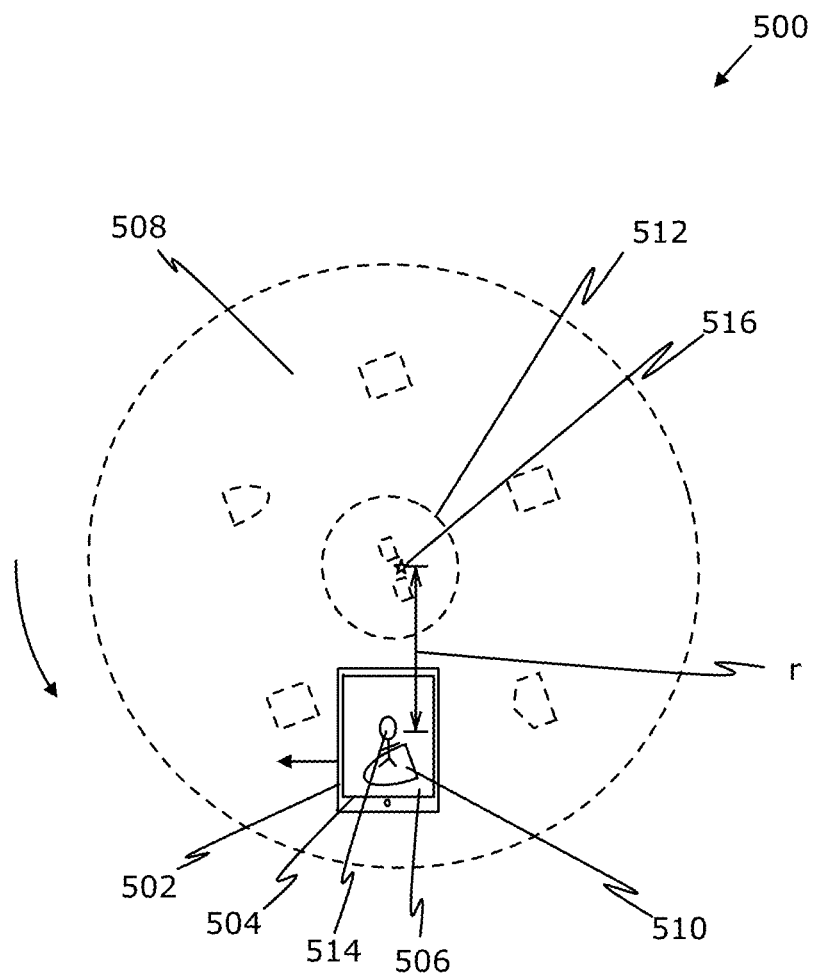

As shown in FIG. 5, the user interface 500 is rendered on a display 502 of a computing device 504. The user interface 500 provides a digital map 506. The digital map 506 is scrolled to the left, such that the locator object 514 displaces to a new locator co-ordinate 516 (the half-elliptical shaped) from a previous one (the pentagon shaped) in the first area 508, keeping the target area 512 in a predetermined direction r. Notably, the digital map 506 is rotated along a point of rotation 516. It will be appreciated that the point of rotation 516 is located within the target area 512.

Figure 6:
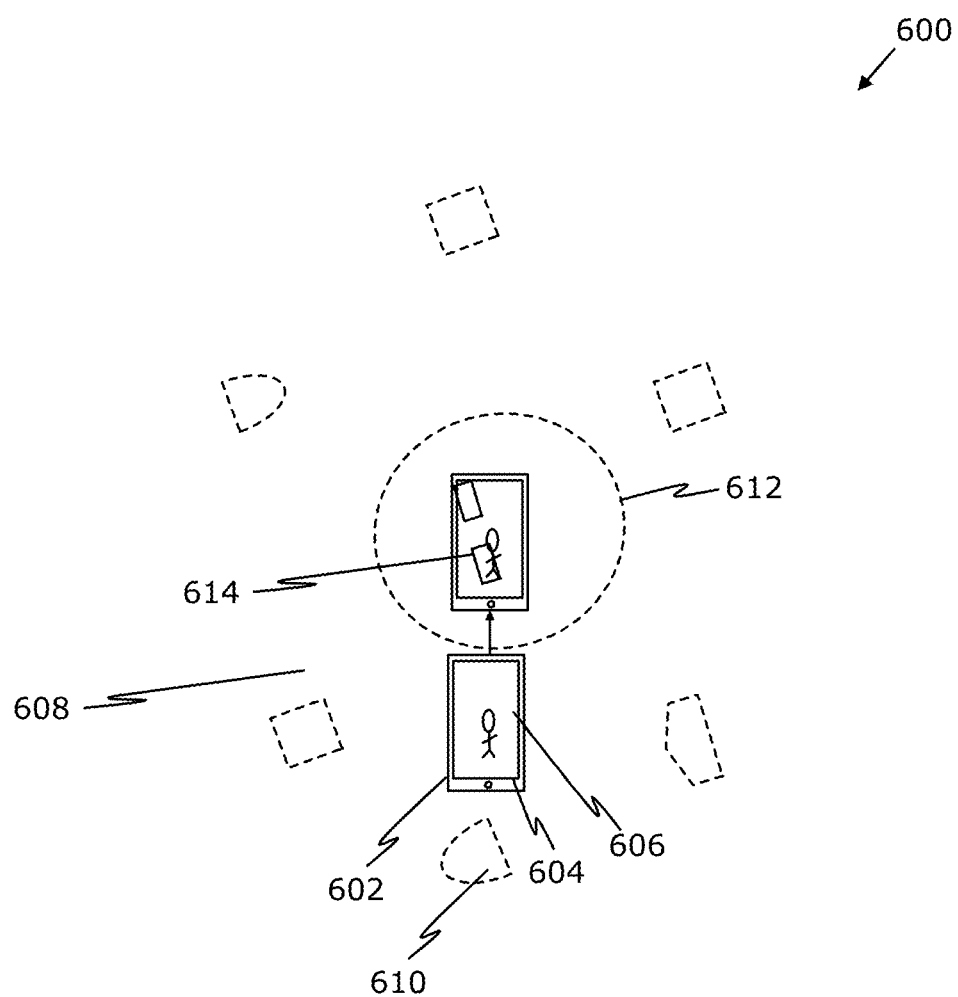

As shown in FIG. 6, the user interface 600 is rendered on a display 602 of a computing device 604. The user interface 600 provides a digital map 606. Moreover, the locator object 614 moves from a locator co-ordinate 610 of a first area 608 to reach the target area 612. It will be appreciated that the orientation of the digital map 606 is same (i.e. is not rotated further from the orientation achieved in FIG. 5) as it was when the locator object 614 was approaching the target area 612.

Figure 7:
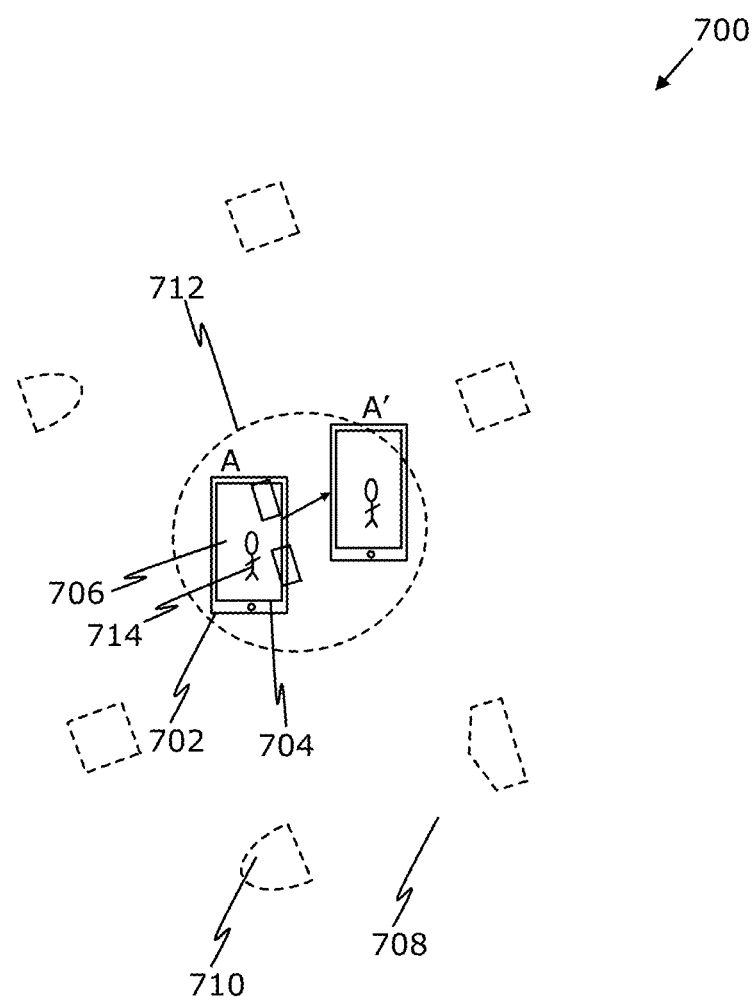

As shown in FIG. 7, the user interface 700 is rendered on a display 702 of a computing device 704. The user interface 700 provides a digital map 706. Moreover, the locator object 714 is within the target area 712 and the digital map 706 is not rotated further. Furthermore, the locator object 714 can mov to left, right, up or down on the digital map 704, from a first location A to a second location A' within the target area after crossing at least one of the location coordinates 710 of a first area 708.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for rendering a user interface, the method comprising:
   providing a digital map, the digital map comprising a first area surrounding at least partly a target area;
   defining a point of rotation within the target area, wherein the target area has a predetermined radius from the point of rotation;
   rotating, about the point of rotation, the digital map to align the target area in a predetermined direction (r) with respect to the user interface;
   rendering a locator object in the user interface, wherein the locator object is rendered at a centre with respect to the user interface;
   controlling the locator object to move in the predetermined direction (r) with respect to the user interface, wherein a speed of the rotation along the point of rotation is a function of a distance of the locator object from the point of rotation and a function of a speed of the movement of the locator object in the predetermined direction (r) and the speed of the rotation is inversely proportional to the distance of the locator object from the point of rotation; and
   generating an illusion of movement of the locator object on the user interface by re-rendering at least one portion of the digital map based on the predetermined direction with respect to the user interface.

2. The method according to claim 1, wherein the rotation of the digital map is one of:
   clockwise in respect to the point of rotation, if the movement of the locater object within the first area is indicated towards a right direction in respect to the predetermined direction (r);
   counter clockwise in respect to the point of rotation, if the movement of the locater object within the first area is indicated towards a left direction in respect to the predetermined direction; and
   disabled when the locator object is within the target area.

3. The method according to claim 2, further comprising scrolling the digital map in a direction of movement of the locator object when the locator object is within the target area.

4. The method according to claim 2, further comprising maintaining the locator object in a non-rotational state.

5. The method according to claim 1, wherein the speed of rotation is slower if the locator object is far from the point of rotation and the speed of rotation is faster if the locator object is close to the point of rotation.

6. The method according to claim 1, wherein the user interface is implemented as one or more of a navigation map-type user interface or a game map-type user interface.

7. The method according to claim 1, wherein the user interface comprises a mini digital map providing a high-level view of the digital map.

8. A computer program product for rendering a user interface, the computer program product comprising a non-transitory machine-readable data storage medium having stored thereon program instructions that, when accessed by a processor, cause the processor to carry out the method of claim 1.

9. A computing device for rendering a user interface, the computing device comprising:
   a display for rendering the user interface; and
   a processor configured to:

providing a digital map, the digital map comprising a first area surrounding at least partly a target area;

defining a point of rotation within the target area, wherein the target area has a predetermined radius from the point of rotation;

rotating, about the point of rotation, the digital map to align the target area in a predetermined direction (r) with respect to the user interface;

rendering a locator object in the user interface, wherein the locator object is rendered at a centre with respect to the user interface;

controlling the locator object to move in the predetermined direction (r) with respect to the user interface, wherein a speed of the rotation along the point of rotation is a function of a distance of the locator object from the point of rotation and a function of a speed of the movement of the locator object in the predetermined direction (r) and the speed of the rotation is inversely proportional to the distance of the locator object from the point of rotation; and generating an illusion of movement of the locator object on the user interface by re-rendering at least one portion of the digital map based on the predetermined direction with respect to the user interface.

10. The computing device according to claim 9, wherein the processor is further configured to rotate the digital map:

clockwise in respect to the point of rotation, if the movement of the locater object within the first area is indicated towards a right direction in respect to the predetermined direction (r); and counter clockwise in respect to the point of rotation, if the movement of the locater object within the first area is indicated towards a left direction in respect to the predetermined direction, disabled when the locator object is within the target area.

11. The computing device according to claim 10, wherein the processor is further configured to disable rotation of the digital map when the locator object is within the target area.

12. The computing device according to claim 10, wherein the processor is further configured to scroll the digital map in a direction of movement of the locator object when the locator object is within the target area.

13. The computing device according to claim 10, further comprising maintaining the locator object in a non-rotational state.

14. The computing device according to claim 9, wherein the speed of rotation is slower if the locator object is far from the point of rotation and the speed of rotation is faster if the locator object is close to the point of rotation.

15. The computing device according to claim 9, wherein the user interface is implemented as one or more of a navigation map-type user interface or a game map-type user interface.

16. The computing device according to claim 9, wherein the user interface comprises a mini digital map providing a high-level view of the digital map.

* * * * *